United States Patent
Bhandarkar et al.

(10) Patent No.: US 9,556,283 B2
(45) Date of Patent: Jan. 31, 2017

(54) POLYETHYLENE PRODUCTION WITH MULTIPLE POLYMERIZATION REACTORS

(71) Applicant: Chevron Phillips Chemical Company, LP, The Woodlands, TX (US)

(72) Inventors: Maruti Bhandarkar, Kingwood, TX (US); Elizabeth Ann Benham, Spring, TX (US); Rebecca A. Gonzales, Houston, TX (US); Scott E. Kufeld, Houston, TX (US); Joel A. Mutchler, Kingwood, TX (US); Catherine M. Gill, Kingwood, TX (US); Thanh T. Nguyen, Sugar Land, TX (US); Timothy O. Odi, Kingwood, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 217 days.

(21) Appl. No.: 14/339,277

(22) Filed: Jul. 23, 2014

(65) Prior Publication Data

US 2016/0024231 A1    Jan. 28, 2016

Related U.S. Application Data

(63) Continuation of application No. 13/713,232, filed on Dec. 13, 2012, now abandoned.

(51) Int. Cl.
*C08F 2/00* (2006.01)
*C08F 210/00* (2006.01)
(Continued)

(52) U.S. Cl.
CPC .............. *C08F 2/01* (2013.01); *B01J 19/0006* (2013.01); *B01J 19/1837* (2013.01);
(Continued)

(58) Field of Classification Search
CPC ............. C08F 10/00; C08F 2/002; C08F 2/01; C08F 2400/02; B01J 19/1837; B01J 19/245
(Continued)

(56) References Cited

U.S. PATENT DOCUMENTS

| | | | |
|---|---|---|---|
| 4,066,718 A * | 1/1978 | Saito | C08F 297/083 525/323 |
| 5,516,422 A | 5/1996 | Sajbel | |

(Continued)

FOREIGN PATENT DOCUMENTS

| | | |
|---|---|---|
| EP | 1803498 | 7/2007 |
| WO | 2004031245 | 4/2004 |
| WO | 2005077985 | 8/2005 |

OTHER PUBLICATIONS

International Search Report for Application No. PCT/US2015/041721, dated Jan. 5, 2016.
(Continued)

*Primary Examiner* — William Cheung
(74) *Attorney, Agent, or Firm* — Sutherland Asbill & Brennan LLP

(57) ABSTRACT

A system and method for discharging a transfer slurry from a first polymerization reactor through a transfer line to a second polymerization reactor, the transfer slurry including at least diluent and a first polyethylene. A product slurry is discharged from the second polymerization reactor, the product slurry including at least diluent, the first polyethylene, and a second polyethylene. The velocity, pressure drop, or pressure loss due to friction in the transfer line is determined, and a process variable adjusted in response to the velocity, pressure drop, or pressure loss not satisfying a specified value.

29 Claims, 5 Drawing Sheets

(51) Int. Cl.
  *C08F 2/01* (2006.01)
  *B01J 19/00* (2006.01)
  *B01J 19/24* (2006.01)
  *C08F 10/02* (2006.01)
  *B01J 19/18* (2006.01)

(52) U.S. Cl.
  CPC ......... *B01J 19/245* (2013.01); *B01J 19/2435* (2013.01); *B01J 19/2455* (2013.01); *C08F 10/02* (2013.01); *B01J 2208/0007* (2013.01); *B01J 2208/00088* (2013.01); *B01J 2219/0006* (2013.01); *B01J 2219/00033* (2013.01); *B01J 2219/00162* (2013.01); *B01J 2219/00164* (2013.01); *B01J 2219/24* (2013.01)

(58) Field of Classification Search
  USPC ...................................... 526/59, 64, 65, 348
  See application file for complete search history.

(56) References Cited

U.S. PATENT DOCUMENTS

| | | |
|---|---|---|
| 5,565,174 A | 10/1996 | Burns et al. |
| 6,239,235 B1 | 5/2001 | Hottovy et al. |
| 6,875,826 B1 | 4/2005 | Huovinen et al. |
| 7,851,566 B2 | 12/2010 | Damme |
| 2011/0288247 A1* | 11/2011 | Hottovy .................. C08F 10/00 526/64 |
| 2014/0171601 A1 | 6/2014 | Bhandarkar et al. |
| 2014/0171602 A1 | 6/2014 | Bhandarkar et al. |

OTHER PUBLICATIONS

International Search Report for Application No. PCT/US2013/073031, dated Apr. 2, 2014.

* cited by examiner

POLYETHYLENE PRODUCTION WITH MULTIPLE POLYMERIZATION REACTORS

CROSS-REFERENCE TO RELATED APPLICATIONS

This application claims the benefit of U.S. patent application Ser. No. 13/713,232 filed on Dec. 13, 2012, now abandoned.

BACKGROUND

Field of the Invention

The present invention relates generally to polyethylene production and, more specifically, to operating a transfer slurry between two or more polyethylene polymerization reactors.

Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyethylene polymer and its copolymers are used for piping, retail and pharmaceutical packaging, food and beverage packaging, plastic bags, household items, various industrial products, and so forth.

Polyethylene may be produced from the monomer ethylene. If the sole monomer ethylene is used for polymerization, the polyethylene polymer is referred to as a homopolymer, while incorporation of different monomers in addition to ethylene creates a polyethylene copolymer or terpolymer, and so on. In polyethylene production, the comonomer 1-hexene is commonly used in addition to ethylene to control density of the polyethylene. The monomers (ethylene, 1-hexene, etc.) may be added to a polymerization reactor, such as a liquid-phase reactor or a gas-phase reactor, where they are convened to polymers. In the liquid-phase reactor, an inert hydrocarbon, such as isobutane, propane, n-pentane, i-pentane, neopentane, and/or n-hexane, may be utilized as a diluent to carry the contents of the reactor. A catalyst (e.g., Ziegler-Natta, metallocene, chromium-based, etc.) may also be added to the reactor to facilitate the polymerization reaction. Unlike the monomers, catalysts are generally not consumed in the polymerization reaction.

As polymer chains develop during polymerization, solid particles known as "fluff" or "flake" or "powder" are produced. The fluff may possess one or more melt, physical, rheological, and/or mechanical properties of interest, such as density, melt index (MI), comonomer content, molecular weight, and so on. Different fluff properties may be desirable depending on the application to which the polyethylene fluff or subsequently pelletized polyethylene fluff is to be applied. Control of the reaction conditions within the reactor, such as temperature, pressure, chemical concentrations, polymer production rate, catalyst type, and so forth, may affect the fluff properties.

In some circumstances, to increase capacity of a polymerization line or to achieve certain desired polymer characteristics, the polymerization conditions may benefit from employing more than one polyethylene polymerization reactor, with each reactor having its own set of conditions. The conditions, including the polymerization recipe, in the reactors can be set and maintained such that polyethylene polymer product is monomodal, bimodal, or multimodal. In the case of bimodal or multimodal polymers, at least two polyethylene polymers, each having a different molecular weight fraction, for instance, may be combined into one polymer product. In a general sense, a polyethylene produced in each reactor will be suspended in a diluent to form a slurry. The reactors may be connected in series, such that the slurry from one reactor may be transferred to a subsequent reactor, and so forth, until a polyethylene polymer is produced discharging from the final reactor with the desired set of characteristics. For example, a bimodal polymer may be produced by two reactors in series, a trimodal polymer may need three, and so on.

In some instances, unfortunately, the flow of slurry that is transferred from one reactor to the next may become unstable or the transfer slurry flow is lost or greatly reduced, giving unstable production of polyethylene polymer in the reactor system, fouling of the slurry transfer line, and so on. Such problematic operation may result in off-spec polyethylene polymer and downtime of the polyethylene reactor system.

SUMMARY OF THE INVENTION

An aspect of the invention relates to a method of operating a polyethylene reactor system, including: discharging continuously a transfer slurry from a first polymerization reactor through a transfer line to a second polymerization reactor, the transfer slurry comprising diluent and a first polyethylene; discharging a product slurry from a second polymerization reactor, the product slurry comprising diluent, the first polyethylene, and a second polyethylene; determining a pressure loss due to friction in the transfer line; and adjusting a process variable in response to the pressure loss exceeding a specified value.

Another aspect of the invention relates to a method of operating a polyethylene reactor system, including: polymerizing ethylene in a first polyethylene reactor to form a first polyethylene; discharging continuously from the first polymerization reactor a transfer slurry comprising diluent and the first polyethylene through a transfer line to a second polymerization reactor; polymerizing ethylene in the second polyethylene reactor to form a second polyethylene; discharging continuously from the second polyethylene reactor a product slurry comprising diluent, the first polyethylene, and the second polyethylene; determining a velocity of the transfer slurry in the transfer line; and maintaining the velocity greater than a specified or minimum value.

Yet another aspect of the invention relates to a method of controlling a polyethylene reactor system, including: polymerizing ethylene in a first polymerization reactor to form a first polyethylene; discharging continuously from the first polymerization reactor a transfer slurry comprising diluent and the first polyethylene through a transfer line to a second polymerization reactor; polymerizing ethylene in the second polymerization reactor to form a second polyethylene; discharging continuously from the second polymerization reactor a product slurry comprising diluent, the first polyethylene, and the second polyethylene; calculating pressure loss due to friction in the transfer line; and maintaining the first polymerization reactor and the second polymerization reactor at substantially the same pressure in response to the pressure loss being less than a specified value.

Yet another aspect of the invention relates to a polyethylene production system including: a first polyethylene loop reactor, a second polyethylene loop reactor; a first transfer line to transfer polyethylene slurry from the first polyethylene loop reactor to the second polyethylene reactor; and a control system to determine a pressure drop in the first transfer line and to place in service a second transfer line to transfer polyethylene slurry from the first polyethylene loop reactor to the second polyethylene reactor.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

Embodiments of the present techniques relate to determining pressure drop or pressure loss due to friction in a polyethylene slurry transfer line between two polyethylene polymerization reactors disposed in series. Operation of the polyethylene polymerization reactors may be adjusted in response to the determined pressure drop or pressure loss.

Figure 1:
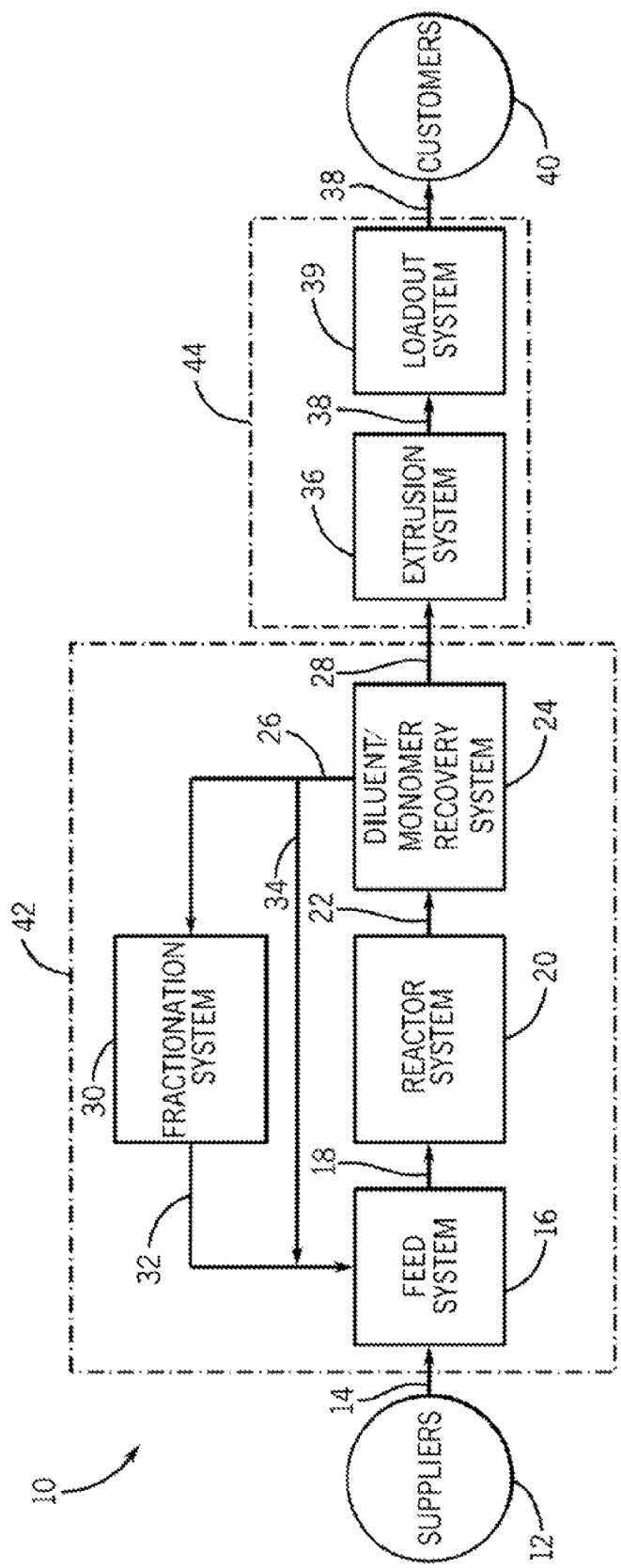
FIG. 1 is a block flow diagram depicting an exemplary polyethylene production system for producing polyethylene in accordance with embodiments of the present techniques.

Turning now to the drawings, and referring initially to FIG. 1, a block diagram depicts an exemplary production system 10 for producing the polyolefin polyethylene. The exemplary production system 10 is typically a continuous operation but may include both continuous and batch systems. An exemplary nominal capacity for the exemplary production system 10 is about 700-1400 million pounds of polyethylene produced per year. Exemplary hourly design rates are approximately 70,000 to 150,000 pounds of polymerized/extruded polyethylene per hour. It should be emphasized, however, that the present techniques apply to polyolefin manufacturing processes including polyethylene production systems having nominal capacities and design rates outside of these exemplary ranges.

Various suppliers 12 may provide reactor feedstocks 14 to the production system 10 via pipelines, ships, trucks, cylinders, drums, and so forth. The suppliers 12 may include off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-butane, n-hexane, and n-heptane), chain transfer agents (such as hydrogen), catalysts (such as Ziegler-Natta catalysts, chromium catalysts, and metallocene catalysts) which may be heterogeneous, homogenous, supported, unsupported, and co-catalysts (such as, triethylboron, organoaluninum compounds, methyl aluminoxane, triethylaluminun, etc.), and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the case of ethylene monomer feed, the ethylene may be fed to the polymerization reactors without intermediate storage in the feed system 16 in certain embodiments. In the system 16, the feedstocks 14 may be treated or processed prior to their introduction as feed 18 into the polymerization reactors. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be activated and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams. In total, the feedstocks 14 and recovered reactor effluent are processed in the feed system 16 and fed as feed streams 18 (e.g., streams of monomer ethylene, comonomer, diluent, catalysts, co-catalysts, hydrogen, additives, or combinations thereof) to the reactor system 20. As discussed below, the streams 18 may be delivered in feed conduits to the reactor which tap into the wall of the polymerization reactor in the reactor system 20.

The reactor system 20 may have one or more reactor vessels, such as liquid-phase or gas-phase reactors. If multiple reactors are employed, the reactors may be arranged in series, in parallel, or in other combinations or configurations. In the polymerization reactor vessels, one or more olefin monomers (e.g., ethylene) and optionally comonomers (e.g., 1-hexene) are polymerized to form a product polymer particulates, typically called fluff or granules. The fluff may possess one or more melt, physical, rheological, and/or mechanical properties of interest, such as density, melt index (MI), molecular weight, copolymer or comonomer content, modulus, and the like. The reaction conditions, such as temperature, pressure, flow rate, mechanical agitation, product takeoff, component concentrations, catalyst type, polymer production rate, and so forth, may be selected to achieve the desired fluff properties.

In addition to the one or more olefin monomers, a catalyst that facilitates polymerization of the ethylene monomer is typically added to the reactor. The catalyst may be a particle suspended in the fluid medium within the reactor. In general, Ziegler catalysts, Ziegler-Natta catalysts, metallocenes, and other well-known polyolefin catalysts, as well as co-catalysts, may be used. An example of a particular catalyst is a chromium oxide catalyst containing hexavalent chromium on a silica support. Typically, an olefin free diluent or mineral oil, for example, is used in the preparation and/or delivery of the catalyst in a feed conduit that taps into the wall of the polymerization reactor. Further, diluent may be fed into the reactor, typically a liquid-phase reactor. The diluent may be an inert hydrocarbon that is liquid at reaction conditions, such as isobutane, propane, n-butane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor. Diluent, as indicated, may also be used for reactor or line flushes to mitigate plugging or fouling, to facilitate flow of the polymer slurry in lines, and so on.

A motive device may be present within each of the one or more reactors in the reactor system 20. For example, within a liquid-phase reactor, such as a loop slurry reactor, an impeller may create a mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

The discharge of polyethylene fluff product slurry 22 of the reactors from system 20 may include the polymer polyethylene fluff as well as non-polymer components, such as diluent, unreacted monomer/comonomer, and residual catalyst. In construction of the reactors in certain embodiments, a discharge nozzle and conduit may be installed (e.g., welded) at a tap or hole cut into the reactor wall. The discharge of the fluff product slurry 22 exiting the reactor (e.g., the final reactor in a series of reactors) through the discharge nozzle may be subsequently processed, such as by a diluent/monomer recovery system 24.

The diluent/monomer recovery system 24 may process the fluff product slurry 22 from the reactor system 20 to separate non-polymer components 26 (e.g., diluent and unreacted monomer) from the polymer fluff 28. The diluent/monomer may be flashed in recovery system 24 to separate the diluent/monomer from the fluff 28.

A fractionation system 30 may process the untreated recovered non-polymer components 26 (e.g., diluent/monomer) to remove undesirable heavy and light components and to produce olefin-free diluent, for example. Fractionated product streams 32 may then return to the reactor system 20 either directly (not shown) or via the feed system 16. Such olefin-free diluent may be employed in catalyst preparation/delivery in the feed system 16 and as reactor or line flushes in the reactor system 20.

A portion or all of the non-polymer components 26 may bypass the fractionation system 30 and more directly recycle to the reactor system (not shown) or the feed system 16, as indicated by reference numeral 34. In certain embodiments, up to 80-95% of the diluent discharged from the reactor system 20 bypasses the fractionation system 30 in route to the polymerization feed system 16 (and ultimately the reactor system 20). Moreover, although not illustrated, polymer granules intermediate in the recovery system 24 and typically containing active residual catalyst may be returned to the reactor system 20 for further polymerization, such as in a different type of reactor or under different reaction conditions.

The polyethylene fluff 28 discharging from the diluent/monomer recovery system 24 may be extruded into polyethylene pellets 38 in an extrusion system 36. In the extrusion system 36, the fluff 28 is typically extruded to produce polymer pellets 38 with the desired mechanical, physical, and melt characteristics. Extruder feed may include additives, such as UV inhibitors, antioxidants and peroxides, which are added to the fluff products 28 to impart desired characteristics to the extruded polymer pellets 32. An extruder/pelletizer receives the extruder feed including one or more fluff products 28 and whatever additives have been added. The extruder/pelletizer heats and melts the extruder feed which then may be extruded (e.g., via a twin screw extruder) through a pelletizer die under pressure to form polyolefin pellets. Such pellets are typically cooled in a water system disposed at or near the discharge of the pelletizer.

A loadout system 39 may prepare the pellets 38 for shipment in to customers 40. In general, the polyolefin pellets 38 may be transported from the extrusion system 36 to a product load-out area 39 where the pellets 38 may be stored, blended with other pellets, and/or loaded into railcars, trucks, bags, and so forth, for distribution to customers 40. Polyethylene pellets 38 shipped to customers 40 may include low density polyethylene (LDPE), linear low density polyethylene (LLDPE), medium density polyethylene (MDPE), high density polyethylene (HDPE), enhanced polyethylene, and so on.

The polymerization and diluent recovery portions of the polyethylene production system 10 may be called the "wet" end 42 or "reaction" side of the process 10. The extrusion 38 and loadout 39 systems of the polyethylene production system 10 may be called the "dry" end 44 or "finishing" side of the polyolefin process 10.

Polyolefin (e.g., polyethylene) pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. To form the end-products or components from the pellets 38 prior to distribution, the pellets are generally subjected to processing, such as blow molding, injection molding, rotational molding, blown film, cast film, extrusion (e.g., sheet extrusion, pipe and corrugated extrusion, coating/lamination extrusion, etc.), and so on. Ultimately, the products and components formed from polyolefin (e.g., polyethylene) pellets 38 may be further processed and assembled for distribution and sale to the consumer. For example, a polyethylene milk bottle may be filled with milk for distribution to the consumer, or a fuel tank constructed of polyethylene may be assembled into an automobile for distribution and sale to the consumer.

Process variables in the polyethylene production system 10 may be controlled automatically and/or manually via valve configurations, control systems, and so on. In general, a control system, such as a processor-based system, may facilitate management of a range of operations in the polyethylene production system 10, such as those represented in FIG. 1. Polyolefin manufacturing facilities may include a central control room or location, as well as a central control system, such as a distributed control system (DCS) and/or programmable logic controller (PLC). Of course, the reactor system 20 typically employs a processor-based system, such as a DCS, and may also employ advanced process control known in the art. The feed system 16, diluent/monomer recovery 24, and fractionation system 30 may also be controlled by the DCS. In the dry end of the plant, the extruder and/or pellet loading operations may also be controlled via a processor-based system (e.g., DCS or PLC).

The DCS and associated control system(s) in the polyethylene production system 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

As discussed above, the reactor system 20 may include one or more polymerization reactors, which may in turn be of the same or different types. Furthermore, with multiple reactors, the reactors may be arranged serially or in parallel. Whatever the reactor types in the reactor system 20, a polyolefin particulate product, generically referred to as "fluff" herein, is produced. To facilitate explanation, the following examples are limited in scope to specific reactor types believed to be familiar to those skilled in the art and to combinations. To one of ordinary skill in the art using this disclosure, however, the present techniques are applicable to more complex reactor arrangements, such as those involving additional reactors, different reactor types, and/or alternative ordering of the reactors or reactor types, as well as various diluent and monomer recovery systems and equipment disposed between or among the reactors, and so on. Such arrangements are considered to be well within the scope of the present invention.

One reactor type includes reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor which produces polyolefin, such as polyethylene, is discussed in the present context though it is to be understood that the present techniques may be similarly applicable to other types of liquid phase reactors.

Figure 2:
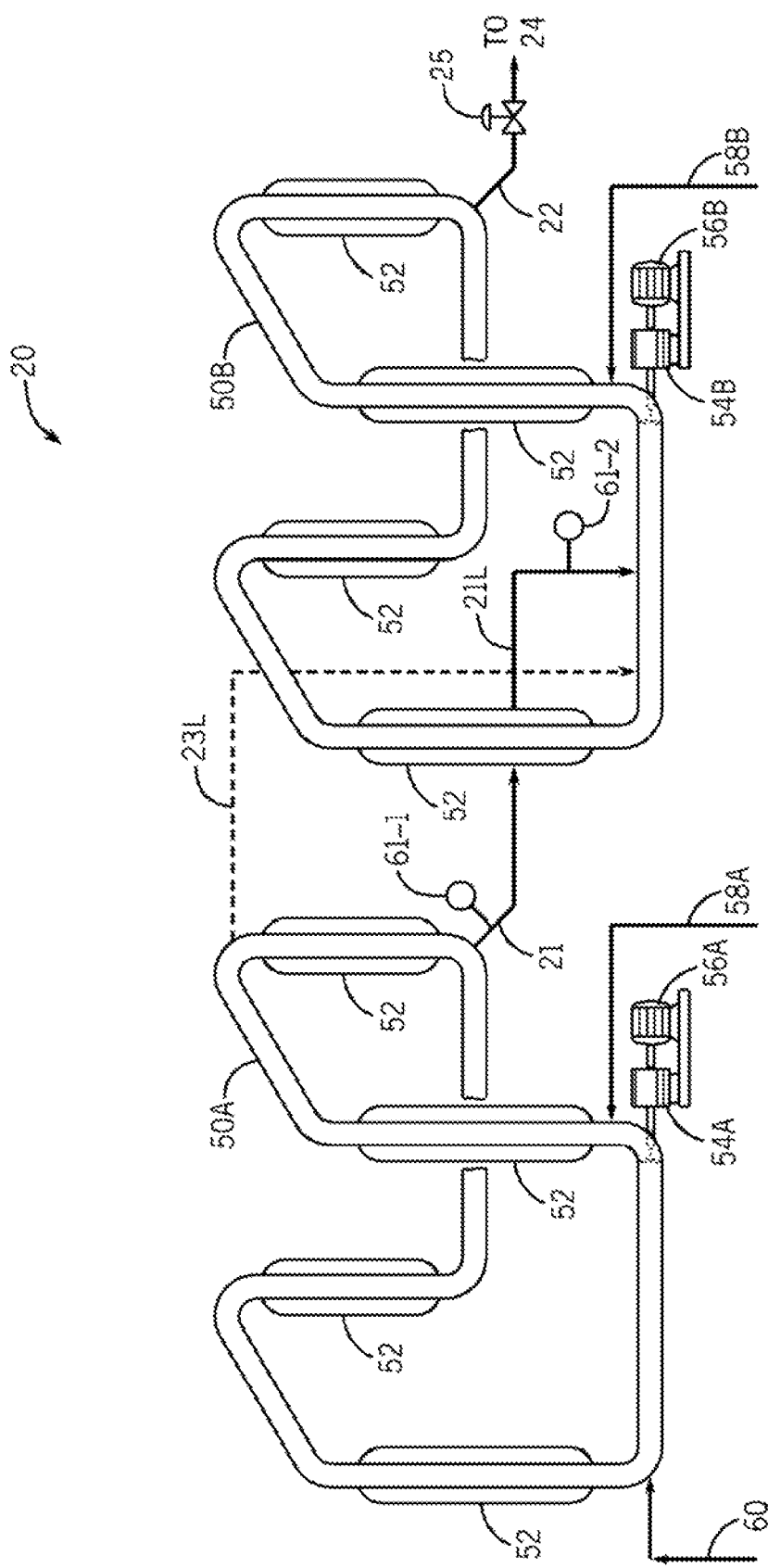
FIG. 2 is a process flow diagram of an exemplary reactor system of the polyethylene production system of FIG. 1 in accordance with embodiments of the present techniques.

FIG. 2 depicts an exemplary polymerization reactor system 20 (of FIG. 1) as having two loop slurry (polymerization) reactors 50A, 50B disposed and operated in series. Of course, additional loop reactors or other reactors (e.g., gas phase reactors) may be disposed in series or parallel in the illustrated combination. Moreover, in alternate embodiments, processing equipment may be disposed between the two loop reactors 50A, 50B (see FIG. 5 and FIG. 6, for example). Further, the operational configuration of the two depicted loop reactors 50A, 50B may be shifted to a parallel operation. Indeed, the present techniques contemplate a variety of reactor system configurations such as those disclosed in U.S. Patent Application No. 2011/0288247 which is incorporated by reference herein in its entirety.

A loop slurry reactor 50A, 50B is generally composed of segments of pipe connected by smooth bends or elbows. The representation of the loop reactors 50A, 50B in FIG. 2 is simplified, as appreciated by the skilled artisan. Indeed, an exemplary reactor 50A, 50B configuration may include eight to sixteen or other number of jacketed vertical pipe legs, approximately 24 inches in diameter and approximately 200 feet in length, connected by pipe elbows at the top and bottom of the legs. FIG. 2 shows a four leg segment reactor arranged vertically. It could also be arranged horizontally. The reactor jackets 52 are normally provided to remove heat from the exothermic polymerization via circulation of a cooling medium, such as treated water, through the reactor jackets 52.

The reactors 50A, 50B may be used to carry out polyolefin (e.g., polyethylene) polymerization under slurry conditions in which insoluble particles of polyolefin (e.g., polyethylene) are formed in a fluid medium and are suspended as slurry until removed. A respective motive device, such as pump 54A, 54B, circulates the fluid slurry in each reactor 50A, 50B. An example of a pump 54A, 54B is an in-line axial flow pump with the pump impeller disposed within the interior of the reactor 50A, 50B to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 56A, 56B or other motive force.

In certain embodiments, the pump 54A, 54B may be operated to generate an exemplary head or pressure differential through a loop reactor 50A, 50B of about 18 pounds per square inch (psi), 20 psi, or 22 psi, and so on, i.e., between the discharge of the pump 54A, 54B and the suction of the pump 54A, 54B. As much as 50 psi or more is possible. The pump head (pressure differential provided by the pump 54A, 54B) can be affected by the speed of rotation of the impeller and the impeller design. Higher pressure differential can also be produced by the use of at least one additional pump.

The fluid medium within each reactor 50A, 50B may include olefin monomers and comonomers, diluent, co-catalysts (e.g., alkyls, triethylboron, TiBAL, TEAl, methyl aluminoxane, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed stream 58A, 58B, which generally corresponds to one of the feed streams 18 of FIG. 1.

Likewise, a catalyst, such as those previously discussed, may be added to the reactor 50A, 50B via a conduit at a suitable location, such as depicted at feed stream 60, which may include a diluent carrier and which also generally corresponds to one of the feed streams 18 of FIG. 1. Again, the conduits that feed the various components tie-in (i.e., flange or weld) to the reactor 50A, 50B. In the illustrated embodiment, catalyst feed 60 is added to the first reactor 50A in series but not to the second reactor 50B. However, active catalyst may discharge in a fluff slurry 21 from the first reactor 50A to the second reactor 50B. Moreover, while not depicted, a fresh catalyst 60 may be added to the second reactor 50B. In total, the added components including the catalyst and other feed components generally compose a fluid medium within the reactor 50A, 50B in which the catalyst is a suspended particle.

The reaction conditions, such as temperature, pressure, and reactant concentrations, in each reactor 50A, 50B are regulated to facilitate the desired properties and production rate of the polyolefin in the reactor, to control stability of the reactor, and the like. Temperature is typically maintained below that level at which the polymer product would go into solution, swell, soften, or become sticky. As indicated, due to the exothermic nature of the polymerization reaction, a cooling fluid may be circulated through jackets 52 around portions of the loop slurry reactor 50A, 50B to remove excess heat, thereby maintaining the temperature within the desired range, generally between 150° F. to 250° F. (65° C. to 121° C.). Likewise, pressure in each loop reactor 50A, 50B may be regulated within a desired pressure range, generally 100 to 800 psig, with a range of 450-700 psig being typical.

As the polymerization reaction proceeds within each reactor 50A, 50B, the monomer (e.g., ethylene) and any comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from each reactor 50 via a settling leg or other means, such as via a Ram valve and/or a continuous take-off (CTO), and so on.

As mentioned, FIG. 2 depicts two loop reactors 50A, 50B in series. The two loop reactors 50A, 50B may be operated such that the polyethylene fluff in the fluff slurry 22 discharging from the second reactor 50A, 50B is monomodal, bimodal, or multimodal. In certain cases of monomodal production, the reactor operating conditions may be set such that essentially the same polyethylene is polymerized in each reactor 50A, 50B. However, monomodal production may incorporate co-monomer or other components in different proportions in each reactor to give a monomodal polyethylene fluff product. In the case of bimodal production, the reactor operating conditions may be set such that the polyethylene polymerized in the first reactor is different than the polyethylene polymerized in the second reactor. In sum, with two reactors, a first polyethylene produced in the first loop reactor 50A and the second polyethylene produced in the second loop reactor 50B may combine to give a bimodal polyethylene or a monomodal polyethylene.

Operation of the two loop reactors 50A, 50B may include feeding more comonomer to the first polymerization reactor than to the second polymerization rector, or vice versa. The operation may also include feeding more hydrogen to the second polymerization reactor than the second reactor, or vice versa. Of course the same amount of comonomer and/or the same amount of hydrogen may be fed to each reactor 50A, 50B. Further, the same or different comonomer concentration may be maintained in each reactor 50A, 50B. Likewise, the same or different hydrogen concentration may be maintained in each reactor 50A, 50B. Furthermore, the first polyethylene (i.e., polyethylene polymerized in the first reactor 50A) may have a first range for a physical property, and the second polyethylene (i.e., polyethylene polymerized in the second reactor 50B) may have a second range for the physical property. The first range and the second range may be the same or different. Exemplary physical properties include polyethylene density, comonomer percentage, short chain branching amount, molecular weight, viscosity, melt index, and the like.

As indicated, the polyethylene product fluff slurry 22 discharges from the second reactor 50B and is subjected to downstream processing, such as in a diluent/monomer recovery system 24 (FIG. 1). The product fluff slurry 22 may discharge through a settling leg, an isolation valve, a full-bore valve, a Ram valve, a continuous take-off (CTO), or other valve configurations. The product fluff slurry 22 may discharge intermittently such as through a settling leg configuration, or instead may discharge continuously. A variety of discharge configurations are contemplated for a continuous discharge. Employment of an isolation valve (e.g., full-bore Ram valve) without an accompanying modulating valve may provide for continuous discharge of slurry from the loop reactor. Further, a CTO is defined as a continuous discharge having at least a modulating flow valve, and provides for a continuous discharge of slurry from the loop reactor. In certain examples, a CTO has an isolation valve (e.g., Ram valve) at the reactor wall and a modulating valve (e.g., v-ball valve) on the discharge conduit. A Ram valve in a closed position may beneficially provide a surface that is flush with the inner wall of the reactor to preclude the presence of a cavity, space, or void for polymer to collect when the Ram valve is in the closed position.

In operation, depending on the positioning of the discharge on the reactor, for example, a discharge slurry 22 having a greater solids concentration than the slurry circulating in the reactor 50B may be realized with a discharge configuration having an isolation valve (Ram valve) alone, or having a CTO configuration with an isolation valve (Ram valve) and modulating valve 25, as depicted in FIG. 2. In this example, the modulating valve 25 may provide for flow control of the discharge slurry 22, as well as facilitate pressure control in the second reactor 50B (and in the first reactor 50A in certain embodiments). Exemplary CTO configurations and control, and other discharge configurations, may be found in the aforementioned U.S. Patent Application No. 2011/0288247, and in U.S. Pat. No. 6,239,235 which is also incorporated herein by reference in its entirety.

In the illustrated embodiment, the product fluff slurry 22 discharges through a CTO. In certain examples, a CTO has a Ram valve at the reactor 50B wall, and a modulating flow control valve 25 (e.g., v-ball control valve) on the discharge conduit. Again, however, in an alternate embodiment, the product fluff slurry 22 may discharge through a settling leg configuration, for example, in lieu of a CTO.

A transfer fluff slurry 21 discharges from the first loop reactor 50A to the second loop reactor 50B via a transfer line 21L. The contents of transfer fluff slurry 21 may be representative of the contents of the first loop reactor 50A. However, as with the discharge slurry 22, the solids concentration may be greater in the transfer slurry 21 than in the first loop reactor 50A, depending on the positioning of the inlet of the transfer line 21L on the first loop reactor 50A, for example, and other considerations. Moreover, the transfer line 21L may be a single transfer line as depicted, or a plurality of transfer lines in series, continuous or discontinuous transfer line segments in series, and the like.

Further, the reactor system 20 may include an optional second (parallel) transfer line 23L, which may operate with or in lieu of transfer line 21L. It should be noted that any transfer slurry discharging through the second transfer line 23L may be the same or somewhat different in properties (e.g., solids concentration) than the transfer slurry 21L, depending on the relative positions and configurations of the transfer lines 21L and 23L, for example.

In the illustrated embodiment, the transfer line 21L is the primary transfer line. The transfer fluff slurry 21 may discharge from the first loop reactor 50A into the transfer line 21L through a settling leg, an isolation valve, a Ram valve, a continuous take-off (CTO) having an isolation or Ram valve and a modulating valve, or other valve configuration. In the illustrated embodiment, the discharge of the transfer slurry 21 from the first loop reactor 50A is continuous and not directly modulated. A CTO or settling leg is not employed. Instead, the transfer slurry 21 discharges through an isolation valve or Ram valve (not shown) on the transfer line 21L at the reactor wall and without a modulating valve in this example. In a particular example, the transfer slurry 21 discharges through a full-bore Ram valve maintained in a full-open position, and not additionally through a modulating valve.

The Ram valve may provide for isolation of the transfer line 21L from the loop reactor 50A when such isolation is desired. A Ram valve may also be positioned at the outlet of the transfer line 21L at the wall of the second loop reactor 50B to provide for isolation of the transfer line 21L from the second loop reactor 50B when such isolation is desired. It may be desired to isolate the transfer line 21L from the first and second loop reactors 50B during maintenance or downtime of the reactor system 30, or when an alternate transfer line 23L is placed in service, and so on. The operation or control of the Ram valves may be manual, hydraulic-assisted, air-assisted, remote, automated, and so on. The transfer line 21L may be manually removed from service (e.g., manually closing the Ram valves) or automatically removed (e.g., via a control system automatically closing the Ram valves) from service.

Another transfer line 23L may be placed in service, e.g., in response to unstable operation of the transfer slurry through the transfer line 21L, for example. The another or second transfer line 23L may be manually placed in service or automatically placed in service via a control system, such as with the control system automatically opening Ram valves on the second transfer line 23L. Again, activating the second transfer line 23L in service may be in response to the calculated pressure loss in the first transfer line 21L exceeding a specified value, or in response to other indications of instability in the flow of transfer slurry 21 through the transfer line 21L. In such cases, the transfer line 21L may remain in service or be removed from service. In general, the first transfer lines 21L and the second transfer line 23L may both be in operation at the same time, or may in operate in lieu of one another, and so on.

It should be noted that the design and operation of a second transfer line 23L between reactors are different compared to the design and operation of a second discharge (e.g., second CTO, second flash line) on the second reactor 50B. Indeed, a second CTO on the discharge of the second reactor 50B is not analogous by way of design or operation, much less the need or benefit, to an additional transfer line 23L between the reactors 50A, 50B. For instance, the fluid flow and hydraulics are very different at a much different pressure through the flash line versus a transfer line between reactors. Moreover, the one or more flash lines downstream of the second reactor 50B are directed to heat transfer into the slurry, which is inapposite operation of a transfer slurry through a primary transfer line 21L and a backup transfer line 23L. In fact, flashing of a transferring slurry as it enters the second reactor 50B could be problematic.

Nevertheless, control of pressure (and throughput) in the first loop reactor 50A and the second loop reactor 50B may be facilitated by operation of the CTO flow control valve 25. In some examples, the pressure in the first loop reactor 50A may float on the pressure in the second loop reactor 50B. The reactors 50A, 50B may be maintained at the same, similar, or different pressure. Pressure in the reactors 50A, 50B may be inferred in certain examples from feed pressures and the circulation pump head delivered as indicated on the pump hydraulic curves for the circulation pumps 54A, 54B, and the like. Moreover, pressure elements or instruments may be disposed on the reactors 50A, 50B and on the transfer line 21L to measure pressure. Further, other process variable elements or instruments indicating temperature, flow rate, slurry density, and so forth, may also be so disposed.

Such instrumentation may include a sensor or sensing element, a transmitter, and so forth. For a pressure element, the sensing element may include a diaphragm, for example. For a temperature element or instrument, the sensing element may include a thermocouple, a resistance temperature detector (RTD), and the like, of which may be housed in a thermowell, for instance. Transmitters may convert a received analog signal from the sensing element to a digital signal for feed or transmission to a control system, for example. Of course the various instruments may have local indication of the sense variable. For instance, a pressure element or instrument may be or have a local pressure gauge and a temperature element or instrument may be or have a local temperature gauge, both of which may read locally by an operator or engineer, for example.

The inlet position of the transfer line 21L may couple to the first loop reactor 50A on the discharge side of the circulation pump 54A in the first loop reactor 50A. The outlet position of the transfer line 21L may couple to the second loop reactor on the suction side of the circulation pump 54B in the second loop reactor 50B. Such a configuration may provide a positive pressure differential (i.e., a driving force) for flow of transfer slurry 21 through the transfer line 21L from the first loop reactor 50A to the second loop reactor 50B. In one example, a typical pressure differential is about 18 to 22 pounds per square inch (psi). Indeed, as discussed, a loop reactor pump 54A, 54B may generate a pump head or pressure differential of about 18 psi to 22 psi, for example. Thus, the inlet to the transfer line 21L positioned relatively near the discharge of the pump 54A in the first reactor, and the outlet of the transfer line 21L positioned relatively near the suction of the pump 54B in the second reactor may provide a differential pressure of about 18 psi to 22 psi across the transfer line 21L in certain examples.

The operation of the transfer slurry 21 through the transfer line 21L may be monitored and controlled. Such monitoring and control may facilitate maintaining reliable flow of transfer slurry from the first loop reactor 50A to the second loop reactor 50B. In one example, the velocity of the transfer slurry 21 is determined or calculated. The velocity may be calculated by dividing the flow rate of the transfer slurry 21 (e.g., determined by mass balance and reactor conditions) by the cross sectional area of the transfer line 21L.

Further, the operation of the reactor system 20 may be adjusted to increase the velocity, if the determined or calculated velocity is decreasing and approaching the saltation velocity of the transfer slurry 21, for example. Such process adjustments to increase velocity of the transfer slurry 21 may include to increase polyethylene production rate or throughput through the reactor system 20 (e.g., by increasing catalyst, diluent, and ethylene feeds). Another process adjustment to increase velocity may be to open or increase a diluent flush (not shown) into the transfer line 21L, and so forth. In certain embodiments, the velocity of the transfer slurry 21 through the transfer line 21L may be maintained above 90%, 95%, 100%, 105%, 110%, 115%, 125%, 150%, or 200%, etc. (or percentages there between) of a saltation velocity of the transfer slurry. The velocity of the polyethylene fluff transfer slurry 21 may also be maintained greater than a velocity in the range of 2 feet per second (fps) to 10 fps (e.g., 2 fps, 3 fps, 4 fps, 5 fps, 10 fps), for instance.

In another example, the pressure loss due to friction through the transfer line 21L is calculated as an indicator of reliability of flow of the transfer slurry 21. For instance, the pressure loss due to friction calculated as excessive may indicate potential loss of flow of the transfer slurry 21, i.e., as the pressure loss approaches the typical available pressure differential between the discharge of the first loop pump 54A and the suction of the second loop pump 54B. Such increasing calculated pressure drop may be caused by increasing solids concentration of the transfer slurry, increased flow or throughput rate of the transfer slurry, fouling of the transfer line 21L, and the like. Further, an increasing or excessive pressure loss as calculated through the transfer line 21L may cause an undesirable increase in pressure in the first loop reactor 50A, an undesirable reduced flow of the circulation slurry in the first loop reactor 50A, an undesirable shift along the pump curve of the circulation pump 54A in the first loop reactor, and so on.

A pressure element 61-1 may measure and indicate pressure P1 at the inlet of the transfer line 21L, and another pressure element 61-2 may indicate pressure P2 at the outlet of the transfer line 21L. The sensing portion of the pressure elements 61-1 and 61-2 may include a diaphragm, for example. Such pressure measurements may complement the aforementioned pressure loss calculations. For instance, an increasing pressure P1 as measured by pressure element 61-1 may indicate an obstruction or excessive pressure loss due to friction in the transfer line 21L, such as that might be caused by increasing throughput rate or solids concentration of the transfer slurry, fouling of the transfer line 2 IL, and the like.

In cases where the pressure loss (calculated and/or measured) experienced by the transfer slurry 21 is above a specified or predetermined amount, the reactor system 20 may be adjusted to mitigate a potential loss of flow of the transfer slurry 21 or other undesirable conditions. Process adjustments may include to decrease polyethylene production rate or throughput through the reactor system 20, to increase and/or allow first reactor 50A pressure to increase, decrease pressure in the second polymerization reactor, lower the slurry viscosity in the first polymerization reactor 50A or the transfer line 21, and/or open a second transfer line 23L from the first reactor 50A to the second reactor 50B, and so forth. In one example, the pressure in the first polymerization reactor 50A is increased by increasing pressure or flow rate of one or more feed components to the first polymerization reactor 50A. A decrease in slurry velocity may be implemented by further diluting the slurry with additional diluent feed rate to the first reactor 50A to lower solids concentration, and the like.

In embodiments, a process variable may be adjusted in response to the calculated pressure loss due to friction in the transfer line 21L exceeding a specified amount, such as 5 pounds per square inch (psi), 10 psi, 15 psi, 20 psi, 30 psi, or values there between, and so on. Moreover, the measured pressure P1 (at or near the inlet to the transfer line 21L) and the measured pressure P2 (at or near the outlet of the transfer line 21L) via the pressure elements 61-1 and 61-2, respectively, may provide for an indication of available pressure differential or excessive pressure loss across the transfer line 21L.

This measured available or actual pressure differential may be compared to the calculated pressure loss due to friction. A process variable may be adjusted in response to the calculated pressure loss reaching within a specified percentage (e.g., 50%, 60%, 70%, 80%, etc.) of the measured available or actual pressure differential. Such control may be beneficial if the pressure in the first loop reactor 50A does not float on the pressure in the second loop reactor 50B, for example.

In examples of the pressure in the first loop reactor 50A floating on the second loop reactor 50B, the measured pressure differential across the transfer line 21L may generally equal the calculated pressure loss due to friction across the transfer line. In this context, a measured (actual) pressure differential across the transfer line 21L greater than the calculated or theoretical pressure loss due to friction across the transfer line 21L may indicate problematic or unstable operation of the transfer slurry 21 through transfer line 21L including the presence of an obstruction or polymer fouling in the transfer line 21L, for instance. Thus, with the first reactor pressure floating on the second reactor pressure, a process variable may be adjusted in response to the measured pressure differential exceeding the calculated pressure loss by a specified amount or threshold amount (e.g., a specified percentage). For instance, the set point or threshold amount to make a process adjustment may be the measured pressure differential at 120%, 140%, 160%, 180%, or 200%, etc., of the calculated pressure loss, or the calculated pressure loss less than a specified percentage (e.g., 50%, 60%, 70%, 80%, etc.) of the measured pressure differential.

Figure 3:
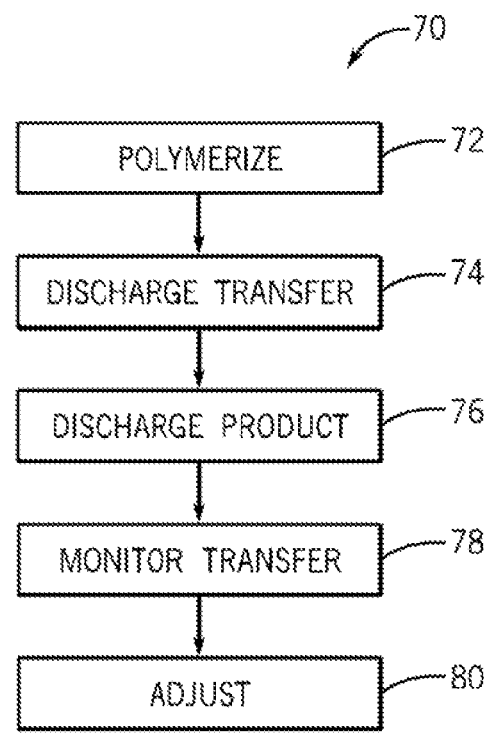
FIG. 3 is a block flow diagram of a method of operating a reactor system in polyolefin production system in accordance with embodiments of the present techniques.

FIG. 3 is a method 70 for operating a polyethylene production system 10 having reactor system 20 with dual loop reactors 50A, 50B. Initially, as represented by block 72, ethylene (and an optional comonomer such as 1-hexene) are polymerized in the first loop reactor 50A to produce a first polyethylene, and polymerized in a second reactor 50B to produce a second polyethylene. In the case of monomodal or non-differentiated production, the first polyethylene may resemble the second polyethylene. On the other hand, in the case of bimodal or differentiated production, the first polyethylene is different in at least some properties than the second polyethylene.

With the two reactors 50A, 50B operating in series, a transfer slurry 21 is discharged (block 74) from the first loop reactor 50A through a transfer line 21L to the second loop reactor 50B. Further, a product slurry 22 is discharged (block 76) from the second loop reactor 50B. The behavior or flow of the transfer slurry 21 through the transfer line 21L is monitored (block 78) such as by determining or calculating velocity or pressure loss of the transfer slurry 21, for example. As discussed, operation of the reactor system 20 (including feeds to the system 20) may be adjusted (block 80) in response to the monitoring and calculations. The monitoring, calculations, and adjustments may be performed via a control system.

To calculate pressure drop through the transfer line 21L, various techniques may be employed including engineering equations and charts, estimations, and so forth. In one example in fluid dynamics, the Darcy-Weisbach equation relates the head loss or pressure loss due to friction along a given length of pipe to the average velocity of the fluid flow. Further related discussion can be found in the well-known Crane Technical Paper No. 410 and in Perry's Chemical Engineers' Handbook (e.g., 8th edition). Of course, fluid flow equations and head loss or pressure drop/loss equations other than Darcy-Weisbach equation may be employed according to the present techniques. A form of the Darcy-Weisbach equation is:

$$\Delta p = f_D \cdot \frac{L}{D} \cdot \frac{\rho V^2}{2}$$

where the pressure loss due to friction $\Delta p$ (units: Pa or kg/ms) is a function of:
  the ratio of the length to diameter of the pipe, L/D;
  the density of the fluid or slurry, $\rho$ (kg/m$^3$);
  the mean velocity of the flow, V (m/s), as defined above;
  Darcy friction factor; a (dimensionless) coefficient of laminar or turbulent flow, $f_D$.

While the Darcy-Weisbach equation may be calculated with SI units as indicated, the equation may also use English units to give pressure loss in psi, for example. Moreover, the pressure loss $\Delta p$ may be denoted as an upstream pressure minus a downstream pressure. In operation in certain examples, the pressure differential across the transfer line 21L may be generally equal to the pressure loss due to friction through the transfer line 21L, such as if the first loop reactor pressure floats on the second loop reactor pressure in steady state operation, for instance. In such instances, the pressure loss $\Delta p$ may be the pressure P1 at the inlet to the transfer line 21L (at the discharge of the first loop reactor) minus the pressure P2 at the outlet of the transfer line 21L (at the inlet to the second loop reactor).

Figure 4:
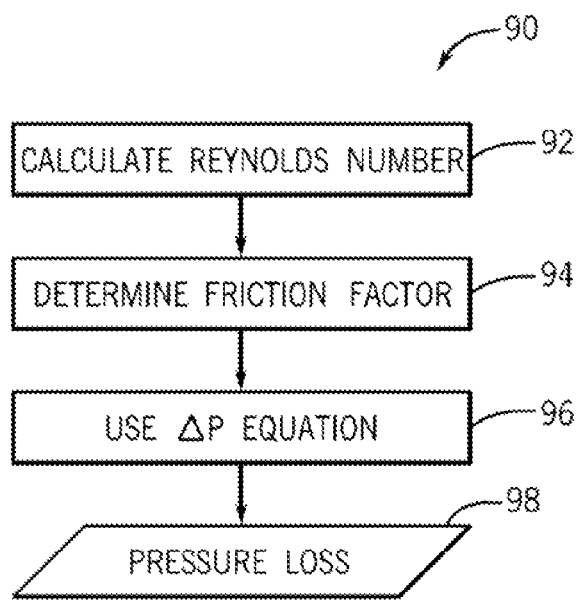
FIG. 4 is a block flow diagram of a method of determining a pressure loss in a slurry transfer line in a reactor system in accordance with embodiments of the present techniques.

FIG. 4 depicts a method 90 for calculating the pressure drop (pressure loss) of the transfer fluff slurry 21 due to friction through the transfer line 21L. Such a method 90 may be employed in the monitoring block 78 of FIG. 3, for example. As can be noted from the above Darcy-Weisbach equation, the Darcy friction factor $f_D$ generally should first be determined prior to calculating pressure loss in certain embodiments. The Darcy friction factor $f_D$ is a function of the dimensionless quantity Reynolds number, Re.

Indeed, as appreciated by the skilled artisan, the Darcy friction factor may be determined as a function of the dimensionless Reynolds number, Re=$D\rho V/\mu$, where D is the inner diameter of the conduit, V is the flow velocity, $\rho$ is the fluid or slurry density, and $\mu$ is the fluid or slurry viscosity (i.e., the kinematic viscosity). The Reynolds number may also indicate whether the flow is laminar or turbulent.

The method 90 of FIG. 4 initially calculates (block 92) the Reynolds Number Re, such as with the above equation for Re. As for the inputs to the Re equation, the slurry density $\rho$ and velocity V can be determined from operating conditions of the reactor system 20. For example, the slurry density is generally a function of the polyethylene solids concentration, the monomers and comonomers employed, and the temperature and pressure. The slurry velocity is the volumetric flow rate of the transfer slurry discharging from the first loop reactor (as may be determined by mass balance, for example) divided by the cross-sectional area of the flow path or inner diameter of the transfer line 21L. The diameter D is the inner diameter of the transfer line 21L. The slurry viscosity $\mu$ may be specified or determined. As appreciated by the skilled artisan, the viscosity of the transfer slurry 21L may be correlative to the diluent viscosity, solids concentration, and the temperature of the transfer slurry 21L, for example.

After the Reynolds number Re has been calculated (block 92), the friction factor (e.g., Darcy friction factor) may be determined (block 94). As known to those skilled in the art, a Moody diagram may relate the friction factor with Reynolds number and relative roughness of the inner surface of the pipe (the transfer line 21L). The roughness (e.g., in fractions of an inch or in millimeters) of the inner surface of the pipe may be based, for example, on design values noted by the pipe manufacturer, operating impact on roughness over time, as so forth. A value for the Darcy friction factor may be read from the Moody diagram based on the previously calculated value for Reynolds number Re and for a roughness (e.g., in inches) of the inner surface of the transfer line 21L. To facilitate reading from the Moody diagram, the roughness may be expressed as a relative roughness, i.e., a ratio of roughness to the inner diameter size. Moreover, the Darcy friction factor can be calculated by iteratively solving the Colebrook equation.

A version of the Colebrook equation that may be used to iteratively calculate the Darcy friction factor may be expressed as follows:

$$\frac{1}{\sqrt{f}} = -2.0 \log\left(\frac{\varepsilon}{3.7D} + \frac{2.51}{R\sqrt{f}}\right)$$

where f is the Darcy friction factor, D is the hydraulic or internal diameter of the conduit or pipe, R is the Reynolds number, and $\epsilon$ is the absolute roughness of the internal diameter of the conduit or pipe.

Equations of relationships other than the Colebrook equations may be employed to determine the Darcy friction factor. Moreover, other friction factors, such as the Fanning friction factor, may be considered or determined, and with the Darcy friction factor equal to four times the Fanning friction factor, and so on.

In the illustrated embodiment, after the friction factor has been determined (block 94), an equation may be used (block 96) to determine pressure loss 98. As indicated, an exemplary pressure loss equation is the Darcy-Weisbach equation. As noted, inputs are the ratio of the length to diameter of the pipe, L/D (which is known for a given transfer line 21), the density $\rho$ and velocity V of the transfer slurry 21 (used in the Re calculation in block 92), and the Darcy friction factor $f_D$. (determined in block 94). As for the length L in the length to diameter L/D ratio, the length L may be the equivalent length L of the transfer line 21L. In other words, as appreciated by the skilled artisan, an equivalent length for pipe fittings, elbows, tees, valves, and so on, in the transfer line 52 may be added to the linear length of the straight pipe to give a total equivalent length of the transfer line 21L to use as for the length L in the Darcy-Weisbach. Further, in alternate embodiments where a CTO is employed on the transfer line, the pressure drop consumption across the CTO may be accounted in the pressure loss calculation.

Moreover, the pressure loss 28 may be expressed in units of pressure and is indicative of the pressure loss due to friction across the transfer line 21L for a flowing slurry 21. In other examples, the pressure loss 28 may be expressed in units of pressure per length, for example, and the pressure loss across the transfer line 21L for a flowing transfer slurry 21L determined by multiplying the pressure loss per unit of length by the length or equivalent length of the transfer line 21L.

Figure 5:
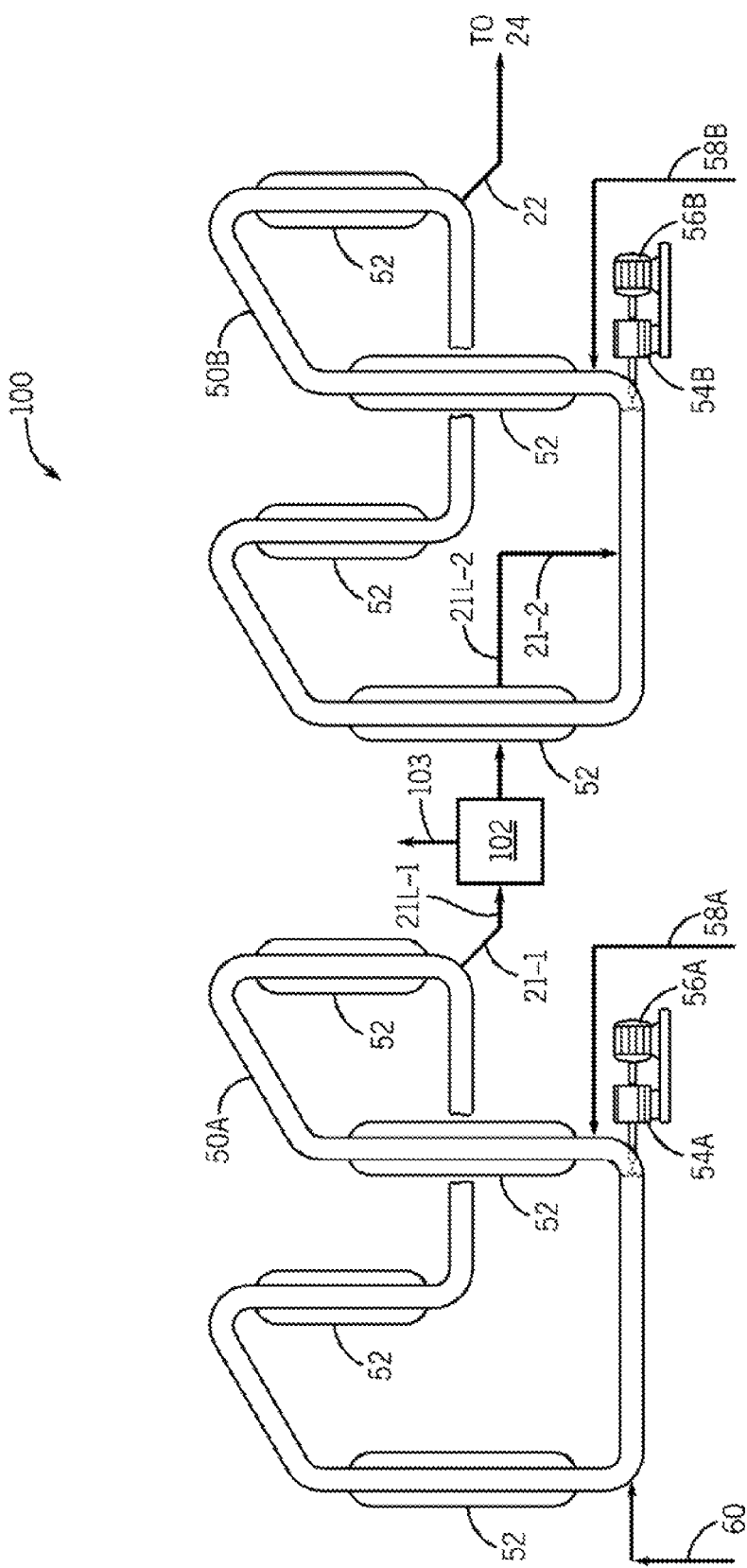
FIG. 5 is a process flow diagram of an exemplary alternate reactor system of a polyethylene production system in accordance with embodiments of the present techniques.

Lastly, FIG. 5 depicts an alternate embodiment of a polyethylene polymerization reactor system 100 in which a fluff processing system 102 is disposed between a first loop reactor 50A and a second loop reactor 50B. The fluff slurry processing system 102 may involve removing light-ends 103 such as hydrogen, monomer (e.g., ethylene), and other components, from the transfer slurry 21-1 discharging from the first loop reactor 50A, for example. Other recovery streams and processing may be involved. Equipment may include flash vessels, distillation columns, pumps, heat exchangers, analytical equipment, control valves, and so on.

As with the reactor system 20 discussed above, the two loop slurry (polymerization) reactors 50A, 50B may be disposed and operated in series, and shifted to parallel operation if desired. Additional loop reactors or other reactors (e.g., gas phase reactors) may be included in the illustrated combination. As also discussed, a loop slurry reactor 50A, 50B is generally composed of segments of pipe connected by smooth bends or elbows. Reactor jackets 52 may be provided to remove heat from the exothermic polymerization via circulation of a cooling medium, such as treated water, through the reactor jackets 52.

The reactors 50A, 50B may be used to carry out polyolefin (e.g., polyethylene) polymerization under slurry conditions. A respective motive device, such as a pump 54A, 541, circulates the fluid slurry in each reactor 50A, 50B. The impeller may be driven by a motor 56A, 56B or other motive force. The various feed components represented by feed streams 58A, 58B discussed above may apply to reactor system 100. Further, a catalyst stream 60 is added to the reactor system 100.

A fluff product slurry 22 may discharge from the second loop reactor 50 and be subjected to further processing including ultimately extrusion into polyethylene pellets. The fluff product slurry may discharge through a setting leg, CTO, Ram valve, or other valving configuration. The fluff product slurry 22 may include a monomodal (or non-differentiated) polyethylene or a bimodal (or differentiated) polyethylene.

A first transfer line 21L-1 may route a first transfer slurry 21-1 from the first loop reactor 50A discharge to the fluff slurry processing system 102. This discharge from the first loop reactor and the associated transfer line 21L-1 may include a Ram valve, a CTO, a settling leg, or other valve arrangement. A second transfer line 21L-2 may route a second transfer slurry 21L-2 from the fluff slurry processing system 102 to the second loop reactor 50B. In certain examples, the a pump in the slurry processing system 102 may provide motive force for flow of the second transfer slurry 21-2 through the second transfer line 21L-2.

The aforementioned techniques (e.g., FIGS. 3-4) regarding calculating or measuring pressure loss due to friction may be applied to the first transfer line 21L-1 and the second transfer line 21L-2 of the illustrated embodiment of FIG. 5. For instance, the pressure loss due to friction through the first transfer line 21L-1 may be calculated using the Darcy-Weisbach equation, and the reactor system 100 adjusted in response. Further, the pressure loss due to friction through the second transfer line 21L-2 may be calculated using the Darcy-Weisbach equation, and the reactor system 100 adjusted in response.

Figure 6:
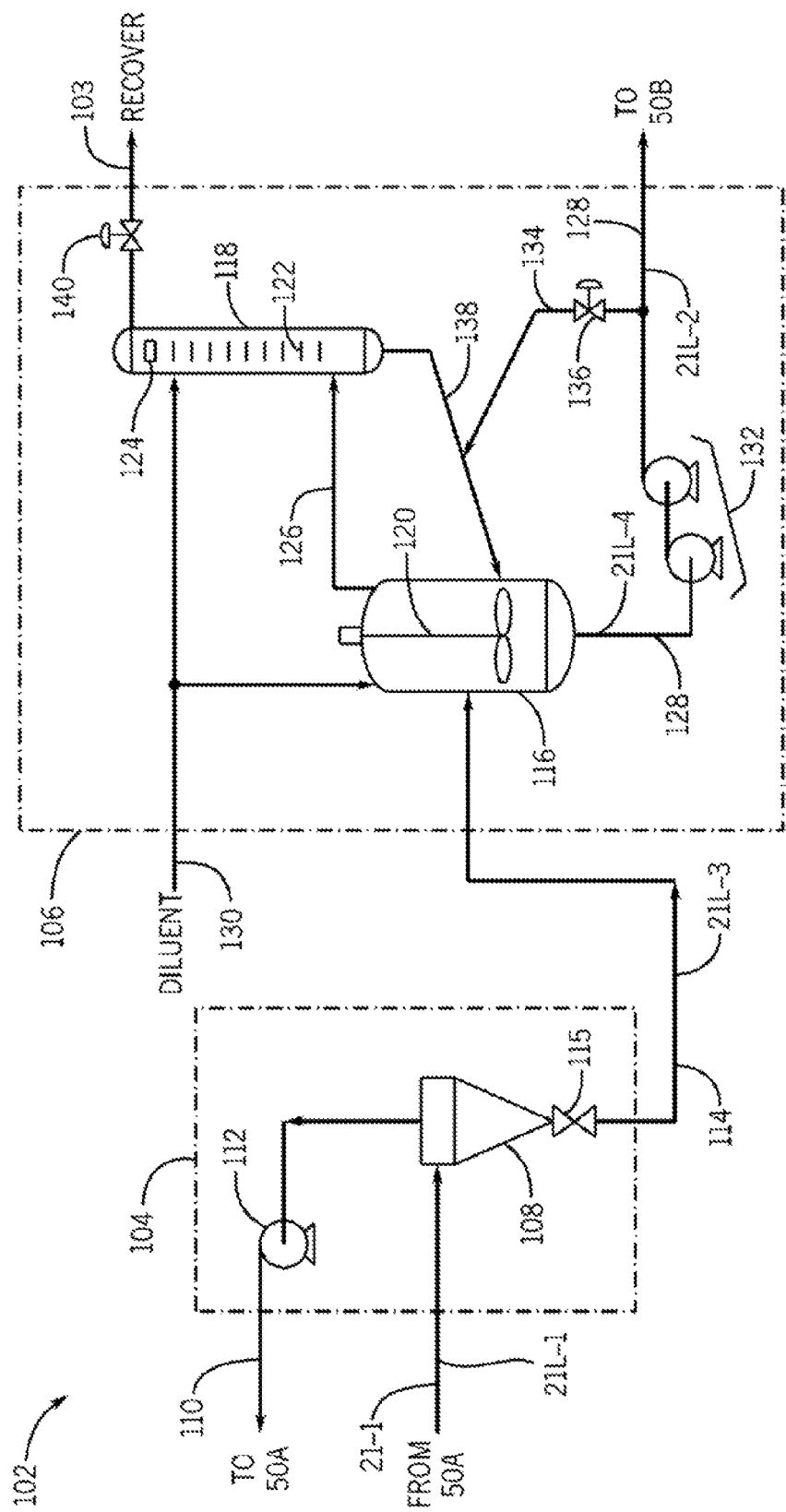
FIG. 6 is a process flow diagram of an exemplary transfer slurry processing system of the alternate reactor system of FIG. 5.

FIG. 6 is an example of a fluff slurry processing system 102 disposed between the first polymerization reactor 50A and the second polymerization reactor 50B. In the illustrated example, the slurry processing system 102 has an optional concentrator system 104 and a lights removal system 106. Of course, other configurations of the slurry processing system 102 may be implemented.

As discussed below, a purpose of the concentrator system 104 may be to form a recycle stream to facilitate control of solids concentration in the first loop reactor 50. Further, the concentrator 106 may reduce hydrocarbon (e.g., diluent, monomer, comonomer, etc.) load sent to the lights removal system 106. Thus, equipment in the lights removal system 106 may be sized smaller providing economic and operating benefit, and so forth.

As indicated, the concentrator system 104 may be eliminated, and the transfer slurry 21-1 discharged from the first reactor 50A sent to the lights removal system 106 or other slurry treatment system. In certain examples, a continuous take-off (CTO) is employed in lieu of or in addition to the concentrator system 104. The CTO may disposed, for instance, at the discharge of the first reactor 50A and transfer line 21L-1. The CTO in such examples may provide for concentrating the transfer slurry 21-1 relative to the circulating slurry in the first loop reactor 50A.

In the illustrated embodiment, the transfer line 21L-1 carries the fluff transfer slurry 21-1 discharged from the first polymerization reactor 50A into the hydrocyclone 108 of the concentrator system 104. A recycle stream 110 from the hydrocyclone 108 may be returned via a pump 112 to the first reactor 50A. The recycle stream 110 may include diluent and fine particles of fluff (which may have active catalyst). The flow rate of the recycle stream 110 may be regulated to facilitate control of solids concentration of the slurry circulating in the first loop reactor 50A. The flow rate of the recycle stream 110 may be modulated with a control valve (not shown), and/or by controlling the speed of the pump 110, and so on.

As for the primary solids stream from the hydrocyclone 108, a concentrated solids slurry stream 114 exits the hydrocyclone 108 across a pressure let down valve 115 to the light gas removal system 106. In the illustrated example, the solids slurry stream 114 travels through a transfer line 21L-3 to a flash vessel 116 in the light gas removal system 106. It should be noted that whether the transfer line 211-3 is characterized as a separate transfer line or as a segment of the overall transfer line between reactors 50A, 50B, the present techniques of calculating pressure loss due to friction and calculating slurry velocity, and making process adjustments in response, and the like, may be applicable.

In this example, the lights removal system 106 may remove light components 103 (e.g., hydrogen, ethylene monomer, etc.) from the transfer slurry 21-1 that discharges from the first polymerization reactor 50A. In the case of hydrogen removal, such may be beneficial in bimodal production, for example, where it is desired to maintain a higher concentration of hydrogen in the first reactor 50A than in the second reactor 50B, for instance. Of course, other applications, such as with the monomer (e.g., ethylene), light comonomers, light diluents, non-condensables, and other light components may be realized. In certain examples, a "light" component may be specified as components having a higher boiling point than the diluent (e.g., isobutane) employed in the first loop reactor 50A.

In the illustrated example of FIG. 6, the light gas removal system 106 includes a flash vessel 116 and a distillation or fractionation column 118. In one example, the flash vessel 116 has a jacket (not shown) for a heating medium such as steam, steam condensate, and so forth. In the case of steam, latent heat may be transferred to the contents of the flash vessel 116. The flash vessel 116 may also have a mixer or agitator 120.

The downstream fractionation column 118 may have a plurality of theoretical stages provided by multiple distillation trays 122. In addition, the fractionation column 118 may also have an overhead condenser 124 disposed at the top of the fractionation column 118 in this example. Further, the flash vessel 116, when equipped with the previously referenced jacket, may function as a reboiler for the fractionation column 118. The flash vessel 116 also functions as a stirred tank to collect solids.

In operation, the solids slurry stream 114 from the hydrocyclone 108 enters the flash vessel 116 where hydrocarbon such as diluent, monomer, and comonomer is flashed overhead and sent as feed stream 126 to the fractionation column 118. The pressure of the flash vessel 116 may be maintained, for example, at 50 psi to 300 psi less than the pressure in the first loop reactor 50A. Such an operating pressure in the single-stage flash in the flash vessel 116 in this example may provide for both flashing of some diluent overhead as well as discharge of liquid diluent from the bottom of the flash vessel 116.

In addition to diluent and monomer, the overhead feed stream 126 from the flash vessel 116 to the fractionation column 118 may contain entrained hydrogen if so employed in the first reactor 50A, as well as some fluff particles including fine particles. Most of the polyethylene fluff particles settle in the flash vessel 116, and discharge from a bottom portion of the flash vessel 116 in a slurry 128. Diluent 130 (e.g., isobutane) may be added to the flash vessel 116.

The slurry 128 discharging from the bottom of the flash vessel 116 may be pumped via a series of pumps 132 to the second loop reactor 50B via transfer line 21L-2. The suction piping of the pumps 132 may be characterized as a slurry transfer line 21L-4 in this example. As mentioned, with regard to the various transfer lines (or transfer line segments), the present techniques of calculating pressure loss due to friction and calculating slurry velocity, and making process adjustments in response, and the like, may be applicable.

A portion 134 of the transfer slurry 128 to the second reactor 50B may be recycled to the flash vessel 116 via a flow control valve 136 in the illustrated embodiment. Moreover, in certain examples, the recycled portion 134 may be sampled, and hydrocarbon in the sample tested with a gas chromatograph, for instance, to determine the composition of the hydrocarbon in the slurry 128. Such composition test results may be used to facilitate control feeds to the reactors 50A, 50B, component concentrations in the reactors 50A, 50B, and the like.

As for the overhead from flash vessel 116, the feed stream 126 discharges from the flash vessel 116 to the fractionation column 118 where vapor travels up the fractionation column 118. As indicated, a steam jacket on the flash vessel 116 may function as a reboiler in that it provides heat at the bottom of the fractionation column 116. The vapor moves up the column 118 and most of the diluent and also any heavy comonomer, e.g., 1-hexene, is condensed by the overhead condenser 124 and falls as a liquid along with any scrubbed polyethylene fine particles down to the flash vessel 116 via stream 138. Diluent 130 (e.g., isobutane) may be added to the fractionation column 118.

A light components stream 103 is discharged overhead from the fractionation column 118 through a pressure control valve 136 to a light ends recovery system, for example. The light components stream 103 may be sampled and tested for composition, such as with a gas chromatograph. Such composition test results may be used to facilitate control feeds to the reactors 50A, 50B, component concentrations in the reactors 50A, 50B, and the like.

In summary, embodiments of the present techniques may provide for an exemplary method of operating a polyethylene reactor system, including feeding ethylene, diluent, and catalyst to a first polymerization reactor, polymerizing ethylene in the first polymerization reactor to form a first polyethylene, and polymerizing ethylene in the second polymerization reactor to form a second polyethylene. The reactors may each be a liquid-phase reactor, a loop reactor, or other types of reactors. The method includes discharging continuously a transfer slurry from the first polymerization reactor through a transfer line to the second polymerization reactor, the transfer slurry including at least diluent, a first polyethylene, and active catalyst. The method includes discharging a product slurry from a second polymerization reactor, the product slurry including at least diluent, the first polyethylene, and a second polyethylene.

The method determines a pressure loss due to friction in the transfer line, and adjusts a process variable in response to the pressure loss exceeding a specified value, e.g., in the range of 5 psi to 30 psi. The adjustment of a process variable may include increasing pressure in the first polymerization reactor and/or allowing pressure to increase in the first polymerization reactor, placing in service another transfer line, lowering the pressure in the second polymerization reactor, and so on. Further, adjusting a process variable may include lowering slurry viscosity in the first polymerization reactor, such as by increasing the diluent feed rate, decreasing solids concentration, and/or increasing temperature of the first polymerization reactor. Also, adjusting a process variable may include placing in service another transfer line and discharging continuously at least a portion of the transfer slurry from the first polymerization reactor through the another (backup) transfer line to the second polymerization reactor.

The determination of pressure loss in the transfer line may include calculating the pressure loss using a Darcy-Weisbach equation, calculating a Reynolds number of the transfer slurry, and determining a friction factor (e.g., using a Colebrook equation) of an internal surface of the transfer line as a function of the Reynolds number of the transfer slurry and a surface roughness to diameter ratio of the internal surface. In other words, the determination of the pressure loss in the transfer line may include determining (e.g., by mass balance) a flow rate of the transfer slurry, calculating a velocity of the transfer slurry as a function of the flow rate, assuming a solids concentration and a viscosity of the transfer slurry, determining a density of the transfer slurry as a function of the solids concentration, and calculating a Reynolds Number of the transfer slurry in the transfer line as a function of the velocity, the density, the viscosity, and an internal diameter of the transfer line. As indicated, the determination of pressure loss may further include assuming a surface roughness to diameter ratio of an internal surface of the transfer line, determining a friction factor of the internal surface as a function of the Reynolds number and the surface roughness to diameter ratio, and calculating the pressure loss as a function of the friction factor, a length to internal diameter ratio of the transfer line, the density, and the velocity.

Moreover, the method may include measuring a pressure differential through the transfer line and adjusting the process variable in response to the measured pressure differential exceeding the determined (i.e., calculated) pressure loss by a specified amount, such as exceeding 150% of the calculated pressure loss. As discussed, measuring the pressure differential may include measuring an inlet pressure of the transfer line and measuring an outlet pressure of the transfer line. The measure pressure differential exceeding the calculated pressure loss may indicate problematic flow, fouling, or an obstruction in the transfer line, for example.

Exemplary embodiments of the present techniques may also provide a method of operating a polyethylene reactor system, including polymerizing ethylene in a first polyethylene reactor to form a first polyethylene, discharging continuously from the first polyethylene reactor a transfer slurry having at least diluent and the first polyethylene through a transfer line to a second polyethylene reactor, polymerizing ethylene in the second polyethylene reactor to form a second polyethylene, and discharging continuously from the second polyethylene reactor a product slurry having at least diluent, the first polyethylene, and the second polyethylene. The method may include determining a velocity of the transfer slurry in the transfer line, and maintaining the velocity greater than a specified value. The specified value be a velocity in the range of about 100% to about 200% of a saltation velocity or settling velocity of the transfer slurry, and/or a velocity in the range of about 2 feet per second to about 10 feet per second, for example. To maintain the velocity, a diluent flush to the transfer line may be adjusted (opened, increased, etc.) to increase the velocity of the transfer slurry if the calculated velocity drops to the specified value.

Furthermore, embodiments of the present techniques may provide a method of controlling a polyethylene reactor system, including polymerizing ethylene in a first polymerization reactor to form a first polyethylene, discharging continuously from the first polymerization reactor a transfer slurry having at least diluent and the first polyethylene through a transfer line to a second polymerization reactor, polymerizing ethylene in the second polymerization reactor to form a second polyethylene, and discharging continuously from the second polymerization reactor a product slurry having at least diluent, the first polyethylene, and the second polyethylene. The method includes calculating pressure loss due to friction in the transfer line, and maintaining the first polymerization reactor and the second polymerization reactor at substantially the same pressure in response to the pressure loss being less than a specified value.

Lastly, embodiments of the present techniques may provide for a polyethylene production system including a first polyethylene loop reactor, a second polyethylene loop reactor, a first transfer line to transfer polyethylene slurry from the first polyethylene loop reactor to the second polyethylene reactor, and a control system to determine a pressure drop in the first transfer line and to place in service a second transfer line to transfer polyethylene slurry from the first polyethylene loop reactor to the second polyethylene reactor. The control system determining pressure drop may include the control system calculating pressure loss due to friction in the first transfer line, and wherein the control system places the second transfer line in service in response to the calculated pressure loss exceeding a pressure loss set point.

The system may include an inlet pressure element disposed on the first transfer line to measure an inlet pressure of the transfer slurry in the first transfer line near or at the first loop reactor, and an outlet pressure element disposed on the first transfer line to measure an outlet pressure of the transfer slurry in the first transfer line near or at the second loop reactor. The control system may place the second transfer line in service in response to measured inlet pressure exceeding a pressure set point, and/or in response to the pressure measure in the first loop reactor exceeding a pressure set point. Moreover, the control system determining pressure drop may include the control system determining an available pressure differential through the first transfer line correlative to the measured inlet pressure and measure outlet pressure, and wherein the control system places the second transfer line in service in response to the available pressure differential exceeding a pressure differential set point.

ADDITIONAL DESCRIPTION

A methods and system for the production for polyethylene has been described. The following clauses are offered as further description:

Embodiment A

A method of operating a polyethylene reactor system, comprising: discharging continuously a transfer slurry from a first polymerization reactor through a transfer line to a second polymerization reactor, the transfer slurry comprising diluent and a first polyethylene; discharging a product slurry from a second polymerization reactor, the product slurry comprising diluent, the first polyethylene, and a second polyethylene; determining a pressure loss due to friction in the transfer line, and adjusting a process variable in response to the pressure loss exceeding a specified value.

Embodiment B

The method of embodiment A, wherein the first polymerization reactor and the second polymerization reactor each comprise a liquid-phase reactor.

Embodiment C

The method of embodiments A through B, wherein the first polymerization reactor and the second polymerization reactor each comprise a loop reactor.

Embodiment D

The method of embodiments A through C, comprising: feeding ethylene, diluent, and catalyst to the first polymerization reactor; polymerizing ethylene in the first polymerization reactor to form the first polyethylene, wherein the transfer slurry comprises active catalyst; and polymerizing ethylene in the second polymerization reactor to form the second polyethylene.

Embodiment E

The method of embodiments A through D, comprising feeding diluent to the second polymerization reactor.

Embodiment F

The method of embodiments A through E, comprising feeding a comonomer to the first polymerization reactor and/or to the second polymerization reactor.

Embodiment G

The method of embodiments A through F, wherein the comonomer comprises propylene, butene, 1-pentene, 1-hexene, 1-octene, and/or 1-decene.

Embodiment H

The method of embodiments A through G, comprising feeding a hydrogen to the first polymerization reactor and/or to the second polymerization reactor.

Embodiment I

The method of embodiments A through H, wherein adjusting a process variable comprises increasing pressure and/or allowing pressure to increase in the first polymerization reactor.

Embodiment J

The method of embodiments A through 1, wherein increasing pressure in the first polymerization reactor comprises increasing diluent feed pressure to the first polymerization reactor.

Embodiment K

The method of embodiments A through J, wherein adjusting a process variable comprises lowering slurry viscosity in the first polymerization reactor.

Embodiment L

The method of embodiments A through K, wherein lowering slurry viscosity comprises increasing diluent feed rate to the first polymerization reactor, decreasing solids concentration in the first polymerization reactor, and/or increasing temperature in the first polymerization reactor.

Embodiment MN

The method of embodiments A through L, wherein adjusting a process variable comprises lowering pressure in the second polymerization reactor.

Embodiment N

The method of embodiments A through M, wherein lowering pressure in the second polymerization reactor comprises increasing an open position of a flow control valve through which the product slurry discharges from the second polymerization reactor.

Embodiment O

The method of embodiments A through N, wherein adjusting a process variable comprises placing in service another transfer line and discharging continuously at least a portion of the transfer slurry from the first polymerization reactor through the another transfer line to the second polymerization reactor.

Embodiment P

The method of embodiments A through O, wherein the specified value comprises a pressure loss in the range of about 5 pounds per square inch (psi) to 30 psi.

Embodiment O

The method of embodiments A through P, wherein determining the pressure loss comprises calculating the pressure loss using a fluid flow equation.

Embodiment R

The method of embodiments A through Q, wherein the fluid flow equation comprises a Darcy-Weisbach equation.

Embodiment S

The method of embodiments A through R, comprising measuring a pressure differential through the transfer line and adjusting the process variable in response to the measured pressure differential exceeding the determined pressure loss by a specified amount.

Embodiment T

The method of embodiments A through S, wherein the specified amount comprises a threshold amount as a percentage of the determined pressure loss.

Embodiment U

The method of embodiments A through T, wherein measuring the pressure differential comprises measuring an inlet pressure of the transfer line and measuring an outlet pressure of the transfer line.

Embodiment V

The method of embodiments A through U, wherein determining the pressure loss in the transfer line comprises calculating a Reynolds number of the transfer slurry, and determining a friction factor of an internal surface of the transfer line as a function of both the Reynolds number and a surface roughness to diameter ratio of the internal surface.

Embodiment W

The method of embodiments A through V, wherein determining the friction factor comprises calculating the friction factor using a Colebrook equation.

Embodiment X

The method of embodiments A through W, wherein determining the pressure loss in the transfer line comprises: determining a flow rate of the transfer slurry; calculating a velocity of the transfer slurry as a function of the flow rate; determining a density of the transfer slurry; and calculating a Reynolds Number of the transfer slurry in the transfer line as a function of the velocity, the density, a viscosity of the transfer slurry, and an internal diameter of the transfer line.

Embodiment Y

The method of embodiments A through X, wherein determining a flow rate of the transfer slurry comprises determining the flow rate by mass balance of the polyethylene reactor system.

Embodiment Z

The method of embodiments A through Y, wherein determining the pressure loss in the transfer line comprises determining a friction factor of the internal surface as a function of the Reynolds number and a surface roughness to diameter ratio of the transfer line.

Embodiment AA

The method of embodiments A through Z, wherein determining the pressure loss in the transfer line comprises calculating the pressure loss as a function of the friction factor, a length to internal diameter ratio of the transfer line, the density, and the velocity.

Embodiment AB

A method of operating a polyethylene reactor system, comprising: polymerizing ethylene in a first polyethylene reactor to form a first polyethylene; discharging continuously from the first polyethylene reactor a transfer slurry comprising diluent and the first polyethylene through a transfer line to a second polyethylene reactor, polymerizing ethylene in the second polyethylene reactor to form a second polyethylene; discharging continuously from the second polyethylene reactor a product slurry comprising diluent, the first polyethylene, and the second polyethylene; determining a velocity of the transfer slurry in the transfer line between the first polyethylene reactor and the second polyethylene reactor; and maintaining the velocity greater than a specified value.

Embodiment AC

The method of embodiment AB, wherein the specified value comprises a velocity in the range of about 95% to about 200% of a saltation velocity of the transfer slurry, and/or a velocity in the range of about 2 feet per second to about 10 feet per second.

Embodiment AD

The method of embodiments AB through AC, wherein maintaining comprises adjusting a diluent flush to the transfer line to increase the velocity of the transfer slurry if the velocity drops to the specified value.

Embodiment AE

The method of embodiments AB through AD, wherein the first polyethylene and the second polyethylene combine to give a monomodal polyethylene or a bimodal polyethylene.

Embodiment AF

A method of controlling a polyethylene reactor system, comprising: polymerizing ethylene in a first polymerization reactor to form a first polyethylene; discharging continuously from the first polymerization reactor a transfer slurry comprising diluent and the first polyethylene through a transfer line to a second polymerization reactor; polymerizing ethylene in the second polymerization reactor to form a second polyethylene; discharging continuously from the second polymerization reactor a product slurry comprising diluent, the first polyethylene, and the second polyethylene; calculating pressure loss due to friction in the transfer line between the first polymerization reactor and the second polymerization reactor; and maintaining the first polymerization reactor and the second polymerization reactor at substantially the same pressure in response to the pressure loss being less than a specified value.

Embodiment AG

A polyethylene production system comprising: a first polyethylene loop reactor; a second polyethylene loop reactor; a first transfer line to transfer polyethylene slurry from the first polyethylene loop reactor to the second polyethylene reactor; and a control system to determine a pressure drop in the first transfer line and to place in service a second transfer line to transfer polyethylene slurry from the first polyethylene loop reactor to the second polyethylene reactor.

Embodiment AH

The system of embodiment AG, wherein the control system determining pressure drop comprises the control system calculating pressure loss due to friction in the first transfer line, and wherein the control system places the second transfer line in service in response to the calculated pressure loss exceeding a pressure loss set point.

Embodiment AI

The system of embodiments AG through AH, comprising: an inlet pressure element disposed on the first transfer line to measure an inlet pressure of the transfer slurry in the first transfer line near or at the first loop reactor; and an outlet pressure element disposed on the first transfer line to measure an outlet pressure of the transfer slurry in the first transfer line near or at the second loop reactor.

Embodiment AJ

The system of embodiments AG through AI, wherein the control system places the second transfer line in service in response to the inlet pressure exceeding a pressure set point.

Embodiment AK

The system of embodiments AG through AJ, wherein the control system determining pressure drop comprises the control system determining a pressure differential through the first transfer line correlative to the inlet pressure and outlet pressure, and wherein the control system places the second transfer line in service in response to the pressure differential exceeding a pressure differential set point

Embodiment AL

The system of embodiments AG through AK, wherein the control system places the second transfer line in service in response to a pressure in the first polyethylene loop reactor exceeding a pressure set point.

What is claimed is:

1. A method of operating a polyethylene reactor system, comprising:
   discharging continuously a transfer slurry from a first polymerization reactor through a first transfer line to a second polymerization reactor, the transfer slurry comprising diluent and a first polyethylene;
   discharging a product slurry from a second polymerization reactor, the product slurry comprising diluent, the first polyethylene, and a second polyethylene;
   calculating, during operation of the system, a pressure loss in the first transfer line by,
   determining a flow rate of the transfer slurry,
   calculating a velocity of the transfer slurry as a function of the flow rate,
   determining a density of the transfer slurry,
   calculating a Reynolds Number of the transfer slurry in the first transfer line as a function of the velocity, the density, a viscosity of the transfer slurry, and an internal diameter of the first transfer line, and
   determining a friction factor of an internal surface of the first transfer line as a function of the Reynolds number and a surface roughness to diameter ratio of the internal surface,
   wherein the calculated pressure loss is a function of the friction factor, a length to internal diameter ratio of the first transfer line, the density, and the velocity; and
   measuring, during operation of the system, a pressure differential through the first transfer line to determine a measured pressure differential and adjusting a process variable in response to the measured pressure differential exceeding the calculated pressure loss by a specified amount,
   wherein the adjusting of the process variable comprises increasing and/or allowing pressure to increase in the first polymerization reactor, lowering slurry viscosity in the first polymerization reactor, lowering pressure in the second polymerization reactor, or placing in service a second transfer line and discharging continuously at least a portion of the transfer slurry from the first polymerization reactor through the second transfer line to the second polymerization reactor.

2. The method of claim 1, wherein the first polymerization reactor and the second polymerization reactor each comprise a liquid-phase reactor.

3. The method of claim 1, wherein the first polymerization reactor and the second polymerization reactor each comprise a loop reactor.

4. The method of claim 1, further comprising:
   feeding ethylene, diluent, and catalyst to the first polymerization reactor;
   polymerizing ethylene in the first polymerization reactor to form the first polyethylene, wherein the transfer slurry comprises active catalyst; and
   polymerizing ethylene in the second polymerization reactor to form the second polyethylene.

5. The method of claim 1, further comprising feeding diluent to the second polymerization reactor.

6. The method of claim 1, further comprising feeding a comonomer to the first polymerization reactor and/or to the second polymerization reactor.

7. The method of claim 6, wherein the comonomer comprises propylene, butene, 1-pentene, 1-hexene, 1-octene, and/or 1-decene.

8. The method of claim 1, further comprising feeding hydrogen to the first polymerization reactor and/or to the second polymerization reactor.

9. The method of claim 1, wherein the adjusting of the process variable comprises the increasing of the pressure and/or the allowing of the pressure to increase in the first polymerization reactor.

10. The method of claim 9, wherein the increasing of the pressure in the first polymerization reactor comprises increasing diluent feed pressure to the first polymerization reactor.

11. The method of claim 1, wherein the adjusting of the process variable comprises the lowering of the slurry viscosity in the first polymerization reactor.

12. The method of claim 11, wherein the lowering of the slurry viscosity comprises increasing diluent feed rate to the first polymerization reactor, decreasing solids concentration in the first polymerization reactor, and/or increasing temperature in the first polymerization reactor.

13. The method of claim 1, wherein the adjusting of the process variable comprises the lowering of the pressure in the second polymerization reactor.

14. The method of claim 13, wherein the lowering of the pressure in the second polymerization reactor comprises increasing an open position of a flow control valve through which the product slurry discharges from the second polymerization reactor.

15. The method of claim 1, wherein the adjusting of the process variable comprises the placing in service the second transfer line and discharging continuously at least a portion of the transfer slurry from the first polymerization reactor through the second transfer line to the second polymerization reactor.

16. The method of claim 1, wherein the specified value comprises a pressure loss in the range of about 5 pounds per square inch (psi) to 30 psi.

17. The method of claim 1, wherein the determining of the friction factor comprises calculating the friction factor using a Colebrook equation.

18. The method of claim 1, wherein the determining of the flow rate of the transfer slurry comprises determining the flow rate by mass balance of the polyethylene reactor system.

19. The method of claim 1, wherein the transfer slurry has a higher average solids concentration than a first slurry present in the first polymerization reactor.

20. A method of operating a polyethylene reactor system, comprising:
  polymerizing ethylene in a first polyethylene reactor to form a first polyethylene;
  discharging continuously from the first polyethylene reactor a transfer slurry comprising diluent and the first polyethylene through a transfer line to a second polyethylene reactor;
  polymerizing ethylene in the second polyethylene reactor to form a second polyethylene;
  discharging continuously from the second polyethylene reactor a product slurry comprising diluent, the first polyethylene, and the second polyethylene;
  determining, during the operation of the system, a velocity of the transfer slurry in the transfer line between the first polyethylene reactor and the second polyethylene reactor, wherein the velocity is determined by dividing a flow rate of the transfer slurry by a cross-sectional area of the transfer line; and
  maintaining, during the operation of the system, the velocity greater than a specified value by adjusting a diluent flush to the transfer line to increase the velocity of the transfer slurry if the velocity drops to the specified value.

21. The method of claim 20, wherein the specified value comprises a velocity in the range of about 95% to about 200% of a saltation velocity of the transfer slurry, and/or a velocity in the range of about 2 feet per second to about 10 feet per second.

22. The method of claim 20, wherein the first polyethylene and the second polyethylene combine to give a monomodal polyethylene or a bimodal polyethylene.

23. A method of controlling a polyethylene reactor system, comprising:
  polymerizing ethylene in a first polymerization reactor to form a first polyethylene;
  discharging continuously from the first polymerization reactor a transfer slurry comprising diluent and the first polyethylene through a transfer line to a second polymerization reactor, polymerizing ethylene in the second polymerization reactor to form a second polyethylene;
  discharging continuously from the second polymerization reactor a product slurry comprising diluent, the first polyethylene, and the second polyethylene;
  calculating, during the operation of the system, a pressure loss between the first polymerization reactor and the second polymerization reactor by using a fluid flow equation; and
  maintaining, during the operation of the system, the first polymerization reactor and the second polymerization reactor at substantially the same pressure in response to the pressure loss being less than a specified value.

24. The method of claim 23, wherein the fluid flow equation comprises a Darcy-Weisbach equation.

25. The method of claim 23, wherein the specified value comprises a threshold amount as a percentage of the calculated pressure loss.

26. A method of operating a polyethylene reactor system, comprising:
  discharging continuously a transfer slurry from a first polymerization reactor through a first transfer line to a second polymerization reactor, the transfer slurry comprising diluent and a first polyethylene;
  discharging a product slurry from a second polymerization reactor, the product slurry comprising diluent, the first polyethylene, and a second polyethylene;
  calculating, during operation of the system, a pressure loss in the first transfer line by using a fluid flow equation; and
  measuring, during operation of the system, a pressure differential through the first transfer line to determine a measured pressure differential and adjusting a process variable in response to the measured pressure differential exceeding the calculated pressure loss by a specified amount,
  wherein the adjusting of a process variable comprises increasing and/or allowing pressure to increase in the first polymerization reactor, lowering slurry viscosity in the first polymerization reactor, lowering pressure in the second polymerization reactor, or placing in service a second transfer line and discharging continuously at least a portion of the first transfer slurry from the first polymerization reactor through the second transfer line to the second polymerization reactor.

27. The method of claim 26, wherein the fluid flow equation is a Darcy-Weisbach equation defined as:

$$\Delta p = f_D \cdot \frac{L}{D} \cdot \frac{\rho V^2}{2}$$

wherein the pressure loss $\Delta p$ is a function of:
  the Darcy friction factor: a (dimensionless) coefficient of laminar or turbulent flow, $f_D$;
  the ratio of the length to diameter of the transfer slurry line, $L/D$;
  the density of the transfer slurry, $\rho$; and
  the mean velocity of the transfer slurry, $V$.

28. The method of claim 26, wherein the specified amount comprises a threshold amount as a percentage of the calculated pressure loss.

29. The method of claim 26, wherein measuring the pressure differential comprises measuring an inlet pressure of the first transfer line and measuring an outlet pressure of the first transfer line.

* * * * *

UNITED STATES PATENT AND TRADEMARK OFFICE
CERTIFICATE OF CORRECTION

PATENT NO. : 9,556,283 B2
APPLICATION NO. : 14/339277
DATED : January 31, 2017
INVENTOR(S) : Bhandarkar et al.

It is certified that error appears in the above-identified patent and that said Letters Patent is hereby corrected as shown below:

In the Specification

Column 3, Line 29, please change "a reactor system in polyolefin" to --a reactor system in a polyolefin--

Column 6, Line 39, please change "polymer pellets 32" to --polymer pellets 38--

Column 6, Line 61, please change "The extrusion 38" to --The extrusion 36--

Column 10, Line 10, please change "second reactor 50A, 50B" to --second reactor 50B--

Column 11, Line 67, please change "reactor system 30" to --reactor system 20--

Column 14, Line 27, please change "transfer line 21" to --transfer line 21L--

Column 17, Line 16, please change "transfer line 21)" to --transfer line 21L--

Column 17, Line 25, please change "52 may be added" to --21L may be added--

Column 17, Line 31, please change "pressure loss 28" to --pressure loss 98--

Column 17, Line 34, please change "pressure loss 28" to --pressure loss 98--

Column 17, Line 37, please change "21L" to --21--

Column 18, Line 5, please change "loop reactor 50" to --loop reactor 50B--

Column 18, Line 18, please change "second transfer slurry 21L-2" to --second transfer slurry 21-2--

Column 18, Line 43, please change "first loop reactor 50" to --first loop reactor 50A--

Signed and Sealed this
Third Day of July, 2018

Andrei Iancu
*Director of the United States Patent and Trademark Office*

CERTIFICATE OF CORRECTION (continued)
U.S. Pat. No. 9,556,283 B2

Column 18, Line 44, please change "concentrator 106" to --concentrator 104--

Column 19, Line 4, please change "pump 110" to --pump 112--

Column 20, Line 26, please change "of the fractionation column 116." to --of the fractionation column 118.--

Column 20, Line 35, please change "valve 136" to --valve 140--

Column 21, Line 56, please change "The specified value be a" to --The specified value may be a--